United States Patent Office 3,718,282
Patented Feb. 27, 1973

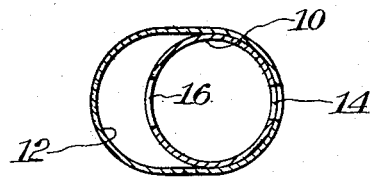
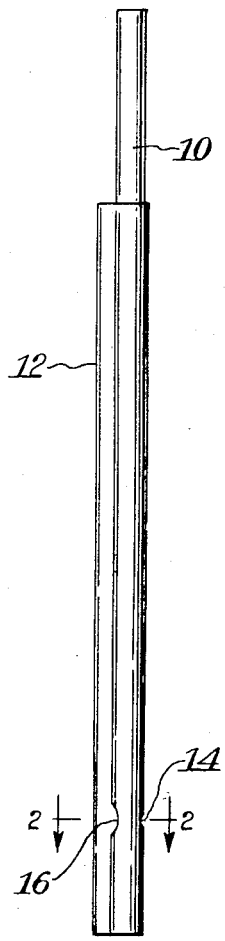
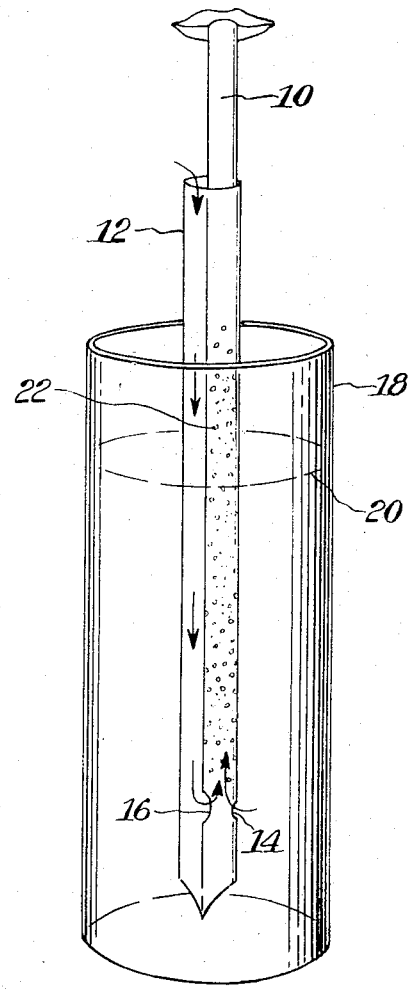

3,718,282
DRINKING STRAWS
Adrian Pizzoferrato, Bronx, N.Y., assignor to The Raymond Lee Organization, Inc., New York, N.Y.
Filed Jan. 20, 1972, Ser. No. 219,300
Int. Cl. A47g 21/18
U.S. Cl. 239—33     3 Claims

ABSTRACT OF THE DISCLOSURE

First and second drinking straws of different length and diameter are bonded together with the shorter straw being of larger diameter and the longer straw being disposed within the shorter straw. The straws have one set of aligned ends. A first relatively small opening extends through both straws in the bonded wall. The longer straw has an oppositely disposed large opening in its wall alone. Both openings are disposed adjacent the aligned ends.

FIELD OF THE INVENTION

My invention is directed toward an arrangement of drinking straws which when in use can transform any noncarbonated beverage into a bubbly effervescent drink.

When used in carbonated beverages, the result is to remove the gases which had been infused in the beverage during manufacture, while retaining an effervescent effect.

SUMMARY

To this end, I provide a relatively long first straw of relatively small diameter and a relatively short second straw of relatively large diameter. The straws are disposed vertically with aligned bottom ends, the first straw being disposed within the second straw. A portion of the wall of the first straw contacts a portion of the wall of the second straw and these portions are bonded together. A first hole extends through the bonded region into both straws adjacent the aligned ends. A second hole in the wall of the first straw is disposed opposite to the first hole. The second hole is larger than the first hole.

The resultant structure, aligned end downward is disposed in a glass of non-carbonated beverage. Liquid is drawn through the first straw in conventional manner. The suction thus created simultaneously forces air to enter the shorter straw. This combination produces a mixing of air and liquid which creates the bubbly effervescent effect desired.

BRIEF DESCRIPTION OF THE DRAWINGS

In the drawings:
FIG. 1 is a side elevation of my invention;
FIG. 2 is a section taken along line 2—2 in FIG. 1; and
FIG. 3 is a perspective showing my invention in use.

DETAILED DESCRIPTION OF PREFERRED EMBODIMENTS

Referring now to FIGS. 1-3, a first transparent vertical relatively long straw 10 having a relatively small diameter is disposed within a second transparent relatively short straw 12 having a relatively large diameter. The straws have aligned bottom ends. A portion of the outer surface of the wall of straw 10 contacts a portion of the inner surface of the wall of straw 12. These portions are bonded together.

A first opening or hole 14 of relatively small diameter extends through the bonded region. A second opening or hole 16 twice as large in diameter is disposed oppositely in straw 10. Both openings are disposed adjacent the aligned ends.

When the structure is disposed into a glass 18 of liquid 20, bottom aligned ends in the liquid, application of suction to the top end of straw 10 provides the air-liquid mixing action and formation of small bubbles 22 as previously described.

If desired, the outer straw 12 can have a vertical slot running its entire length exposing the wall of straw 10 with the hole 14 therein and can be bonded to the outer straw on each side of the slot. The function is unchanged.

While I have described my invention with particular reference to the drawings, such is not to be considered as limiting its actual scope.

Having thus described this invention, what is asserted as new is:

1. A device for drinking fluids which in use can transform any non-carbonated beverage into a bubbly effervescent drink comprising:
   a first vertical drink straw;
   a second vertical drinking straw, said second straw being shorter than the first straw and having a diameter which is larger than that of the first straw; and
   means securing said straws together with the first straw disposed within the second straw, both straws having aligned bottom ends, said device including communicating openings in both straws adjacent the aligned ends;
   wherein said straws are bonded together with a portion of the wall of the first straw being in contact with a portion of the wall of the second straw adjacent said aligned ends, a relatively small opening defining said communicating openings extending through said contacted portions;
   wherein said first straw has another opening therein oppositely disposed with respect to said small openings.

2. The device of claim 1 wherein the other opening is larger than the small opening.

3. The device of claim 2 wherein the ratio of diameters of said openings is 2:1.

References Cited

UNITED STATES PATENTS

| | | | |
|---|---|---|---|
| 2,815,981 | 12/1957 | Nonnamaker et al. | 239—33 |
| 2,943,794 | 7/1960 | Sussman | 239—33 |
| 3,601,317 | 8/1971 | Genantonio | 239—327 |
| 2,192,037 | 2/1940 | Hamilton | 239—33 |

M. H. WOOD, JR., Primary Examiner
J. J. LOVE, Assistant Examiner